United States Patent [19]

Drake, Jr. et al.

[11] Patent Number: 5,289,460
[45] Date of Patent: Feb. 22, 1994

[54] MAINTENANCE OF MESSAGE DISTRIBUTION TREES IN A COMMUNICATIONS NETWORK

[75] Inventors: John E. Drake, Jr.; Elizabeth A. Hervatic, Apex, both of N.C.

[73] Assignee: International Business Machines Corp., Armonk, N.Y.

[21] Appl. No.: 923,125

[22] Filed: Jul. 31, 1992

[51] Int. Cl.$^5$ .............................................. H04L 1/12
[52] U.S. Cl. ...................... 370/17; 370/94.3; 340/825.02; 371/20.1
[58] Field of Search ............... 370/13, 13.1, 16, 17, 370/54, 60, 94.1, 94.3; 340/825.02, 827; 371/20.1

[56] References Cited

U.S. PATENT DOCUMENTS

| | | | |
|---|---|---|---|
| 4,864,559 | 9/1989 | Perlman | 370/60 |
| 5,018,133 | 5/1991 | Tsukakoshi et al. | 370/16 |
| 5,079,767 | 1/1992 | Perlman | 370/94.3 |
| 5,103,444 | 4/1992 | Leung et al. | 370/60 |
| 5,117,430 | 5/1992 | Berglaund | 370/85.1 |
| 5,138,615 | 8/1992 | Lamport et al. | 370/94.3 |

Primary Examiner—Douglas W. Olms
Assistant Examiner—Melvin Marcelo
Attorney, Agent, or Firm—Edward H. Duffield; Gerald R. Woods

[57] ABSTRACT

Each node in a multinode communication system is provided with programming to act as a Set Manager for a given set of nodes and users. Functions of the Set Manager include operation processes for creating distribution trees for efficient multicast and bandwidth reservation tasks. Because set membership is not necessarily fixed or accurate at the time the distribution tree is created, the Tree Leader task that creates and maintains the trees needs accurate and updated information showing the number of users at the nodes it serves which are participating in the distribution tree. The count of active users at nodes served by the Tree Leader is provided in response to an indicia established at the time the Tree Leader sets up the tree. Each Set Manager at a given node monitors for changes in set membership and link failure and notifies the requesting Tree Leaders for each tree in which it participates whenever changes in the number of users either by joining or leaving the set or link failures occur by direct communication between the Set Managers and the Tree Leaders without requiring intervention of other elements in the system.

7 Claims, 9 Drawing Sheets

NN = NODE N
SMN = SET MANAGER NODE N
TUN = TRANSMISSION FACILITIES USER N
TLN = TREE LEADER N
SLN = SET LEADER N
R = REGISTRAR FOR NETWORK

——— PHYSICAL COMMON. LINKS
– – – – – DEFAULT DISTRIB TREE, SET 1
············ TUX'S TREE
– – – – – TUY'S TREE

SET 1 = TU10, TU9, TU6, TU7, TU1, TU5, TUY, TU13, TUX, TUY, TU16, TU12, TU8
TUX'S SUBSET = TUX, TU8, TU5, TU11
TUY'S SUBSET = TUY, TU12, TU5, TU16

FIG. 1

NN = NODE N
SMN = SET MANAGER NODE N
TUN = TRANSMISSION FACILITIES USER N
TLN = TREE LEADER N
SLN = SET LEADER N
R = REGISTRAR FOR NETWORK

──────── PHYSICAL COMMON. LINKS
── ── ── DEFAULT DISTRIB TREE, SET 1
············ TUX'S TREE
─ ─ ─ ─ TUY'S TREE

SET 1 = TU10, TU9, TU6, TU7, TU1, TU5, TUY, TU13, TUX, TUY, TU16, TU12, TU8
TUX'S SUBSET = TUX, TU8, TU5, TU11
TUY'S SUBSET = TUY, TU12, TU5, TU16

MAINTENANCE OF MESSAGE DISTRIBUTION TREES IN A COMMUNICATIONS NETWORK

RELATED APPLICATIONS

This application is related to our own, copending and commonly assigned patent application Ser. No. 07/900,647 filed Jun. 18, 1992 which deals specifically with a basic packet switched network comprising multiple nodes having Set Managers, a network Registrar, Set Leaders and processes for organizing and controlling the network distributed over each node in the form of a Set Manager capable of performing various functions. The invention is more directly related to our own copending, commonly assigned application 07/900,628 filed Jun. 18, 1992 which deals with the message distribution Tree Leader function, the techniques and processes for controlling the creation of distribution trees and their membership and with the services provided by the distribution Tree Leader itself.

FIELD OF THE INVENTION

This invention relates to digital communication systems and networks in general and more specifically to packet transmission systems used in multicast communications to a plurality of users where the users may be grouped into one or more defined subsets managed by Tree Leaders.

PRIOR ART

The use of distribution trees in multinode, multiuser data communication networks is fairly well known. A class of problem that is faced in such systems includes the functions of maintaining set membership and tree membership when the set is an open set having its own, independent existence in which users may join and leave at will, the Set Leader can change, Set Membership is variable and the number of trees per set is variable. The Tree Leaders are persistent for the life of each tree. Supporting the creation and maintenance for multiple trees of this type established among a group of packet transport system users in the prior art requires constant analysis of the network topology by the tree managing function and constant reporting by Set Members as they join and leave the system. This results in a very high level of "maintenance traffic" in the network which occupies an inordinate portion of the bandwidth available for communication of traffic itself.

OBJECTS OF THE INVENTION

In light of the foregoing known difficulties with multicast tree creation and maintenance in a multinode open set network, an object of the present invention is to provide improved means for maintaining a plurality of message distribution trees in a group of message transport users when the Tree Leader and Set Leader functions reside in different nodes when members join or leave the set, or when a link in the distribution tree has failed.

BRIEF SUMMARY OF INVENTION

Within the context of the multinode packet switched communication network of our copending application Ser. No. 07/900,647 utilizing the structures for distribution tree creation and control as shown in our copending application Ser. No. 07/900,628, the present invention provides support and facility for maintaining one or more distribution trees among members in a set of users where Tree Leader and communication Set Leader roles may reside at different nodes. This is facilitated by providing direct communication between the node Set Managers and an identified Tree Leader for each tree having users at a given node. The Tree Leaders indicate to each node at the time the distribution tree is created that the Tree Leader wishes to receive notifications of various types of changes whenever they occur. An indicia code is included in the tree request message described in our aforementioned copending application Ser. No. 07/900,628 which is extended to include another field of values for informing the node Set Managers as to what notifications the Tree Leader desires to receive. These can include: informing the Tree Leader only when users in the subnode leave the set so that the Tree Leader may decrement its user count for the tree at the given subnode of the node at which the change occurs, informing whenever a user within a subnode that is currently on the tree joins the set so that the Tree Leader can increment its user count for that subnode or to inform when all of the users in a subnode leave the set, informing whenever a user in a subnode individually leaves the set only or informing whenever an individual user in a subnode joins and/or leaves the set. The Set Manager for the affected node experiencing a change having been tagged at creation by the Tree Leader with an indication that notification is desired will send a Set Change Notification (SCN) to each Tree Leader having users at the affected node informing the tree leader or tree leaders of the change in membership or of a failure in a communications link necessary to support one or more users in the distribution tree served at that node. By providing direct, independent communication between the Set Manager and the Tree Leader in response to prearranged indicia describing conditions for which the Tree Leader desires to have updated information, a great deal of topology database query and analysis traffic is alleviated entirely and independent actions to the database may also be avoided.

BRIEF DESCRIPTION OF THE DRAWINGS

The foregoing and still other objects of the invention which have not been specifically enumerated are met in a preferred embodiment of the invention which is further described and illustrated with respect to the drawings included herewith in which.

DETAILED DESCRIPTION OF PREFERRED EMBODIMENT OF PREFERRED INVENTION

Figure 1:
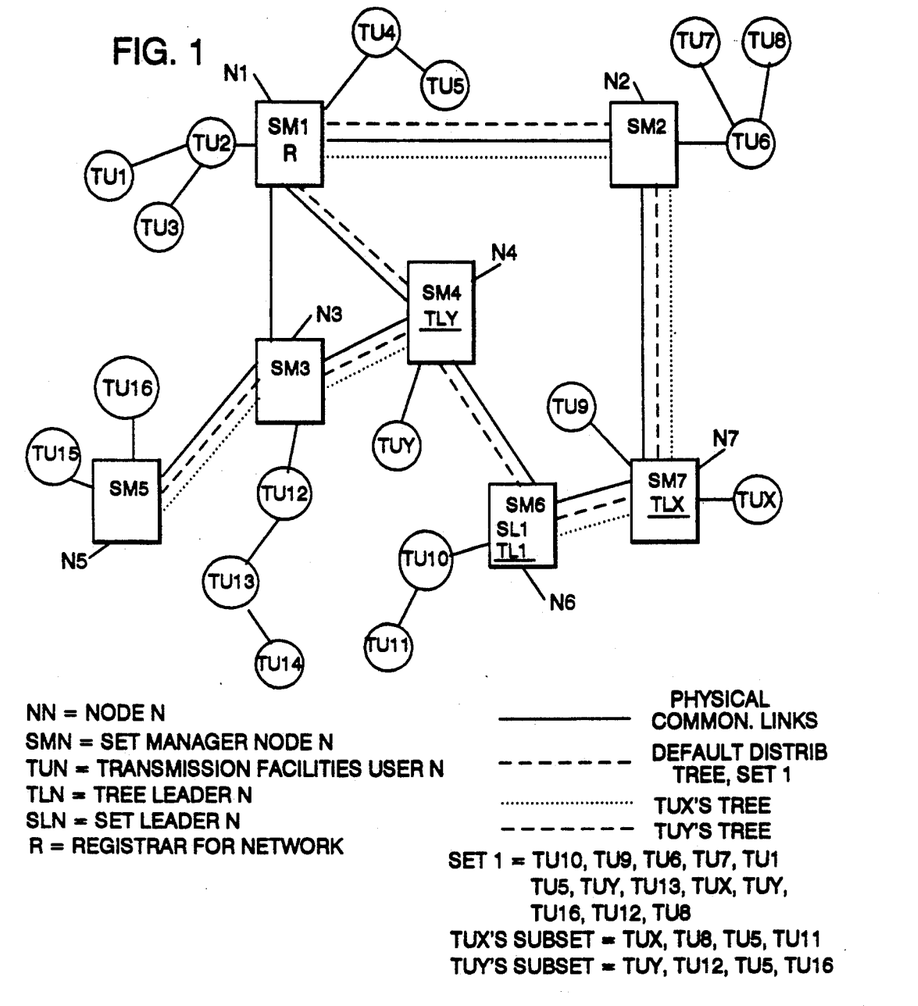
FIG. 1 illustrates schematically a multinode network having a plurality of network transport system users and wherein the nodes perform various functions as Set Managers, Registrar, Set Leaders and Tree Leaders in accordance with our aforementioned copending applications and with this invention.

Turning to FIG. 1, several nodes $N_1$-$N_7$ are illustrated in a hypothetical network. The nodes are connected to one another by physical communication links shown by the solid lines interconnecting them and by similar communications links or connections to their supported transmission users or terminals $TU_n$ as illustrated. As we have previous described in our aforementioned copending, commonly assigned patent applications, each node in the preferred embodiment of the invention includes a Set Manager function identified in FIG. 1 as $SM_n$. A network Registrar having functions of setting up and maintaining set leadership ($SL_n$) is designated as arbitrarily residing at node $N_1$. Three different communication user groups (trees) have been arbitrarily specified among the set of transmission users (TUs) in FIG. 1. These include set 1 identified by $SL_1$ residing in node $N_6$ which is also acting as Tree Leader $TL_1$ for the distribution set managed by the Set Leader $SL_1$. It is not necessary that the Tree Leader and Set Leader functions reside in the same node, however, as will be pointed out later. A given transmission user such as $TU_x$ may establish (via its SM) a distribution tree of its own amongst a subset of the transmission users located at various nodes. For example, $TU_x$ has established a subset comprised of $TU_x$, $TU_8$, $TU_5$ and $TU_{11}$. The Set Leader function, which is not directly involved with managing or creating the distribution trees may reside elsewhere. It is shown as residing in node $N_6$ instead of in the node serving $TU_x$, node $N_7$. Another distribution tree has been established by $TU_y$ residing at node $N_4$ where the Tree Leader $TL_y$ resides, but the Set Leader for the set Y is residing in node $N_6$.

What has been illustrated in FIG. 1 is that various distribution trees for purposes of communication among specific members of a set of nodes and their supported transmission users may be created and that each node may participate in one or more (or none) distribution trees each of which may be managed by a Tree Leader residing at the same or different node. A Set Leader for the entire set of users or separate Set Leaders for different subsets may reside in the same or different nodes also as illustrated.

As developed more fully in our aforementioned copending patent application Ser. No. 07/900,628, the Tree Leader has the main function of creating distribution trees based upon set membership that is required by the transmission user, by the bandwidth requirements specified by the originating user and by the network topology and link capacities. The creation of a distribution tree allows transport users to communicate with a set or within a set to a given subset of users that they select. The present invention describes a distributed mechanism and technique that allow a Tree Leader to maintain its tree in the face of set membership changes and link failures that may occur, but without requiring interaction with the Set Leader or with the network Registrar function.

When a message distribution tree among a subset of users is created, it uses a current user set membership as a starting point. A Tree Leader inquires of the Set Leader as to what the current set membership is and then creates, with access to the topology database, a distribution tree to the desired Set Members at various nodes or their subnodes (connection points at a node which serve a given transmission user or group of users, such as those that may be on a local area network, connected at a single subnode to a node). When the Tree Leader creates the distribution tree, it specifies its own change set notification requirements to each of the node Set Managers that handle the communication between the links and their attached, supported transmission users. For example, if the Tree Leader wishes to be notified whenever a transport user joins or leaves a distribution tree, it sets an indicia value comprising two bits within a set membership notification field of the tree request message which is described in greater detail in our aforementioned copending application. Because the set membership and, indeed, the membership of the distribution tree itself, is not necessarily accurate at the time the Tree Leader creates the tree, replies to the tree request message show the number and/or identity of Set Members that are currently assigned and active at each subnode which is designated as having a user whose presence in the distribution tree is desired. By keeping count of the number of users participating at subnodes included within a given distribution tree, the Tree Leader knows the number of users that are on its tree at any time. This count of active users in the tree is required for a reliable multicast and bandwidth reservation management for the tree. The present invention provides a means and a method for informing the Tree Leader of any changes in set membership or of member or link failures. The mechanism employs direct communication between Set Managers at the various nodes in accordance with the specified notification requirement set by the Tree Leader at the creation of the tree and requires no intervention from the Set Leader which may reside at another node entirely.

As mentioned, the Tree Leader specifies its set or tree user member notification requirements by setting a notification field in each tree request message used in creating or extending the distribution tree. The Tree Leader may request to be informed when transmission users in a given subnode leave the set related to the tree for which it is leader. It can also request to be informed whenever transmission users join the set at a subnode already defined to exist within the tree. Depending upon the message bits in the tree request message, the requested type of notification will be known to the Set Manager and whenever a given TU leaves or joins the set or physical failures either in the Set Member or links of communication occurs, the Set Manger sends a Set Change Notification (SCN) message to each Tree Leader that manages a portion of a distribution tree in which the Set Manager is included, informing them of the change in set membership. Each node Set Manager supports the receipt of all possible values of the set membership notification field and sends the appropriate Set Change Notification (SCN) message as desired. The mechanism for performing this will be described in greater detail later.

The set membership notification field from the Tree Leaders to the Set Managers may comprise two binary bits in the tree request messages sent to create or extend a tree. Tree creation or extension is not specifically a part of the present invention and is therefore not described in detail. However, a portion of the tree request message comprises a field of at least two bits having possible binary values 00, 01, 10, and 11. The meaning of these is arbitrarily assigned in the present invention for informing the Set Manager as to when SCNs are to be sent to the Tree Leader.

The value 00 is assigned the meaning that the Set Manager is to inform the Tree Leaders whenever all the transmission users at a given subnode leave the set. This permits the Tree Leader to prune the distribution tree and decrement its user count at the subnode for each affected tree.

Code 01 is utilized to inform the Set Manager that the Tree Leader is to be notified whenever a user within a subnode currently on the distribution tree served by a Tree Leader joins the set so the Tree Leader can increment the transmission user count for that node and subnode. It is also used to inform the Set Manager that it must send a message whenever all of the transmission users leave the set at a given subnode.

The code 10 is used to inform a Set Manager that it is to create the SCN and identify whenever an individual user at a subnode leaves the distribution tree set. Code 11 is used to inform the Set Manager that the Tree Leader is to be informed with an SCN whenever a user at a subnode joins or leaves the distribution tree set.

The Tree Leader is required to trim or prune his distribution tree as necessary whenever all transmission users at a given subnode have left the set. Whenever a Set Manager receives a tree request message and the specified tree address is found to be valid, the Set Manager adds the appropriate links and terminal connection points which it serves to the distribution tree and records the set membership notification value received in the tree request message so that it may properly notify the Tree Leader whenever any changes of the type for which notification is desired occur in the set membership amongst the users that it serves. For each subnode (i.e. connection point to a node) the Set Manager serving the node records the number of transmission users included with the tree address for the subnode and these values are the transmission user subnode member counts for the distribution tree.

There are several primary reasons why a Tree Leader would receive notification from a Set Manager including: a user joins the distribution tree or leaves it; a Set Manager did not receive the required periodic tree refresh signal; and a time out limit has been reached which results in the Set Manager disconnecting its users from the tree. A Transmission User TU can be added to an existing distribution tree if it happens to reside at a subnode already included on the tree without extending the tree by further tree creation or tree request messages sent by the Tree Leader.

A Tree Leader that is creating a tree for multiparty communication amongst a subset of users can specify in its tree request message whether it wishes to be notified whenever users within the subnodes at a given node in the distribution tree join the set. Thus, whenever a Transmission User joins the set, the Set Manager must check to determine whether the subnode at which the Transmission User is connected may be involved in one or more distribution trees managed by one or more Tree Leaders, respectively. It must then notify the appropriate Tree Leader or Leaders and the terminal Transmission User subnode connection has been added to each of the affected distribution trees.

The Set Manager must also check set membership notification values and notify as required as noted above. To do this, it records the TU's connection point (subnode identification) with the tree's address (the tree address correlator index as described in our aforementioned application). The Set Manager acting as Tree Leader must also increment the user count at the affected subnode of the given tree and compute a route from it to the Tree Leader and send a Set Change Notification message with the tree address correlator, the Transmission User's node ID and subnode ID together with the notification reason such as Transmission User "joined", and the Transmission User's count at the affected subnode on the tree. A message identifier is included to identify the SCN message and inform the Tree Leader of what type SCN message it is receiving. When a Tree Leader receives the message, it acknowledges the receipt, but if the acknowledgement is not received at the Set Manager who originated the SCN, it will resend the message with the same message identifier. When the Tree Leader finally receives the SCN, it checks the message identifier, resends the acknowledgement and discards a duplicate message if one should occur. The Tree Leader may thus maintain its distribution tree whenever set members leave or join the set or when a local Set Member fails or when a communication link to a member or a node fails since the Set Manager controlling the Transmission User access notifies all associated Tree Leaders that requested notification.

A Set Manager checks all of the distribution trees associated with a user set which a Transmission User has left. For each distribution tree, the Set Manager performs the following functions. First, it decrements the user count for the subnode and tree for each distribution tree which may be involved. Secondly, it unmarks, that is deletes the record of the tree address from the TU's terminal connection point (subnode). Finally, the Set Manager will create the Set Change Notification message if the notification value it received is 10, 11 or if the TU resigning from the set was the last TU at that subnode, and it will send the SCN to the Tree Leader together with the tree address correlator which identifies the specific tree, the TU's node ID and subnode and a notification reason, i.e. "TU left set" and a message identifier and a TU subnode count for that tree.

The present invention also accommodates error conditions such as time out of the tree address by reason of a Set Manager not receiving a tree refresh message from the Tree Leader for any reason. Whenever a Set Manager receives a tree refresh message, it resets the tree refresh timer to its initial value as described in our aforementioned copending application. If the timer expires without receipt of a tree refresh message, the Set Manager will delete the tree address from all the trees, links and terminal connection points (subnodes) under its control and send the SCN message to the Tree Leader with the notification reason that it "did not receive the tree refresh message". This is handled at the Tree Leader by the Tree Leader process that will be described in greater detail.

Figure 2:
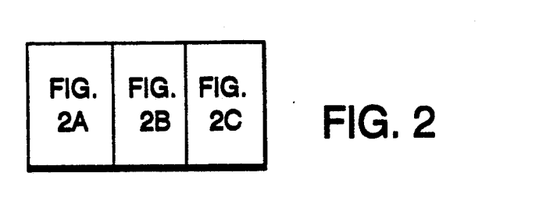
FIG. 2, comprising FIGS. 2A to 2C, schematically illustrates a flowchart of the operations conducted by the Set Manager at each node in the network whenever a transmission system user joins or leaves the set or when a distribution tree refresh interval timer expires without the Set Manager having received a refresh message.
Figure 2A:
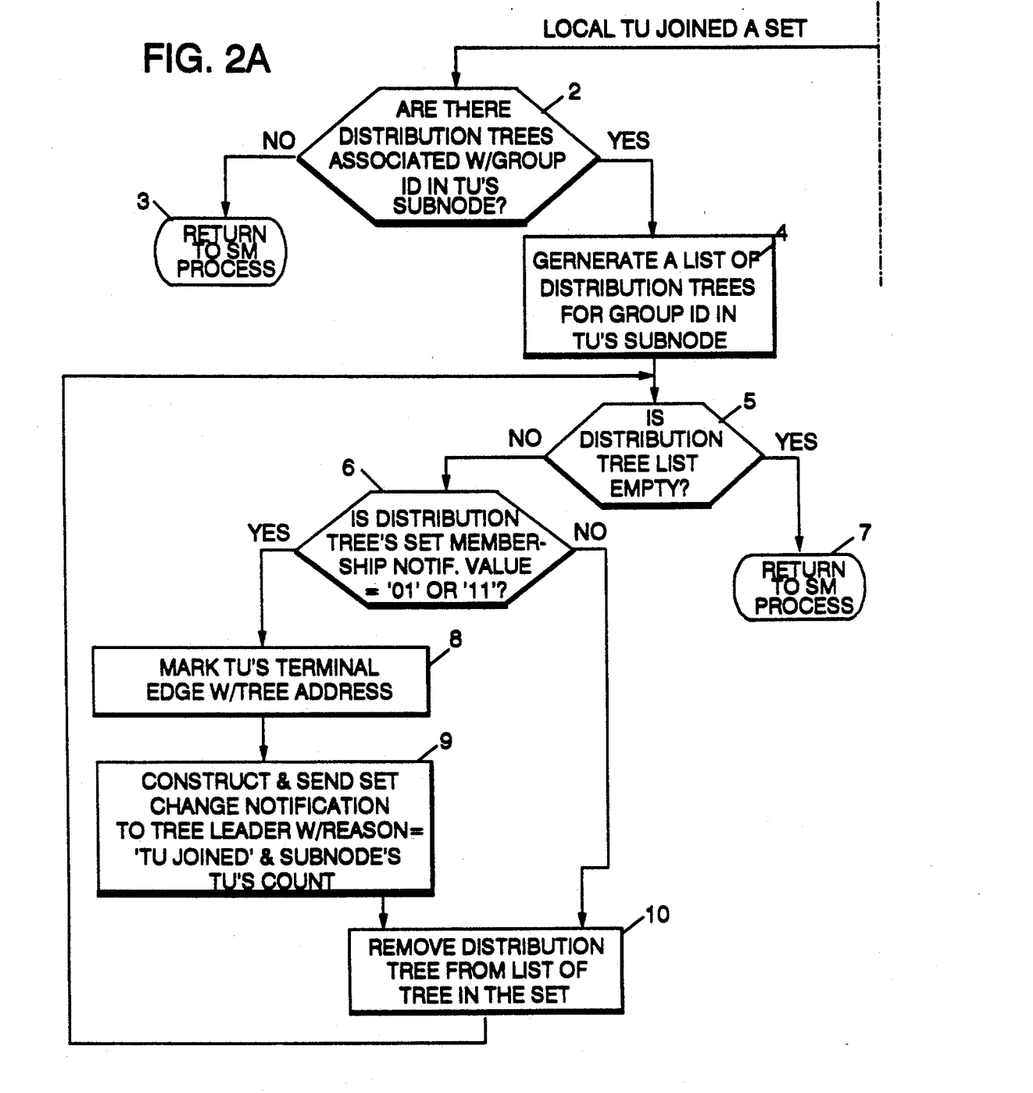
Figure 2B:
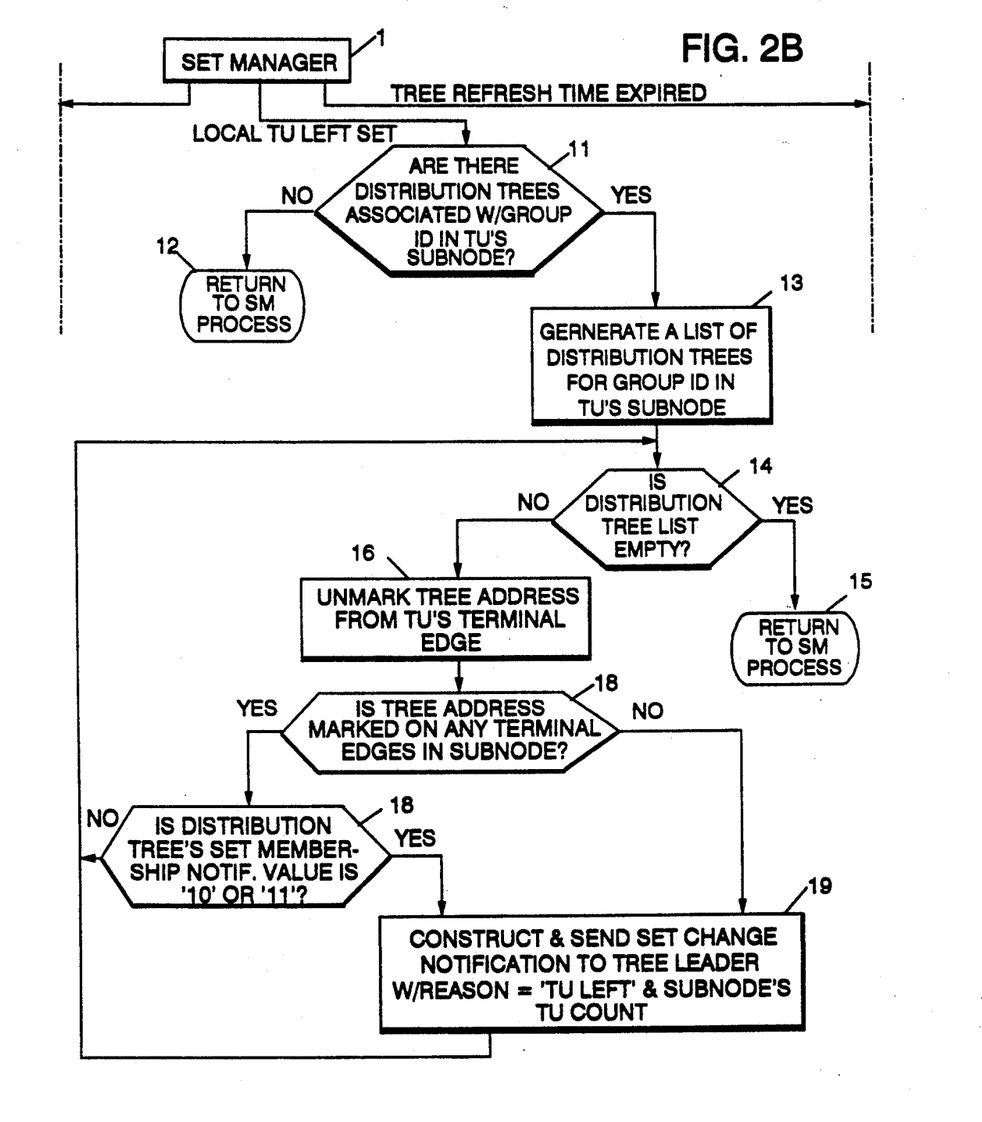
Figure 2C:
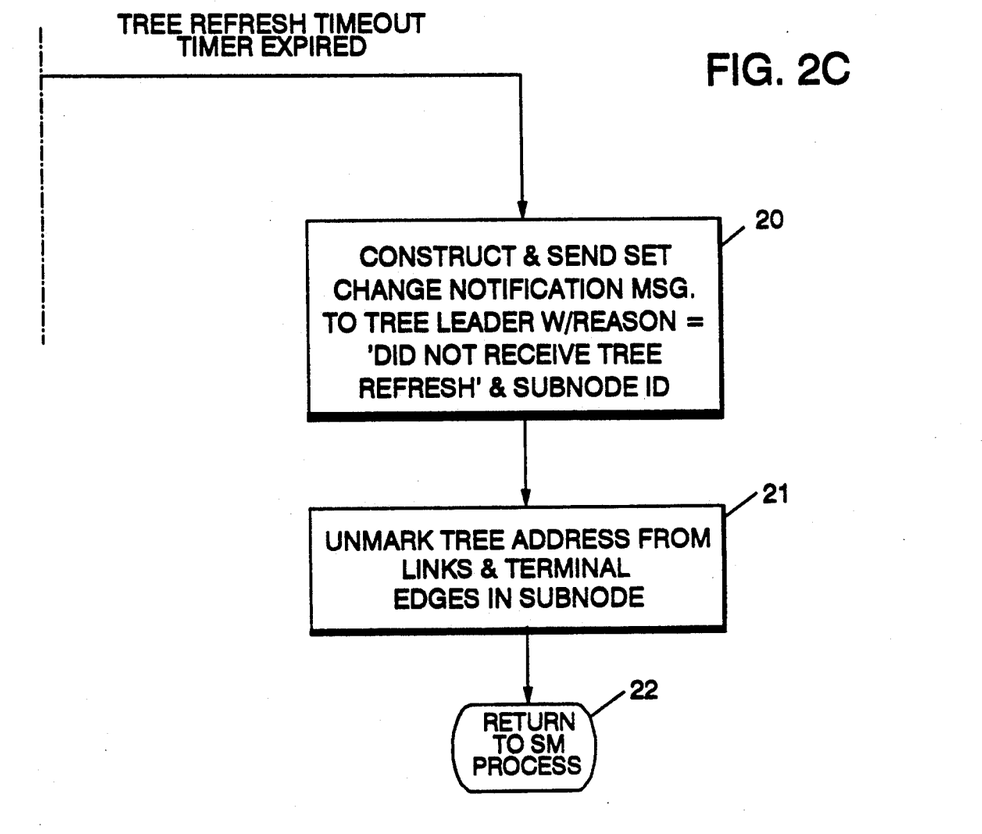

Turning to FIG. 2, the Set Manager acting as Tree Leader is indicated in box 1 and it may receive the SCN or a tree refresh time out to which it will respond in accordance with the flow chart comprising the remainder of FIG. 2.

A set membership notification identifier value is used in the tree creation message sent out by the tree leader when creating a tree and it determines the condition under which the Set Manager at each affected node will generate and send the SCN message during the lifetime of that tree. A Tree Leader may also receive a specific SCN regarding a particular failure if a link fails or a TU fails or if a timeout occurs when the Set Manager was expecting to receive a tree refresh message as indicated above.

When the Set Manager, 1 in FIG. 2, acting as a Tree Leader receives the SCN message, it determines whether it is the intended Tree Leader by examining the tree address correlator identification as described in greater detail in our aforementioned copending application. This address correlator uniquely identifies the specific tree and will be recognized by the Tree Leader which created it. If the Set Manager acting as Tree Leader is not the addressed or intended Tree Leader, it ignores the message. However, if it is the intended Tree Leader it will perform one of the following actions.

If the user count at a given subnode on the tree is greater than zero and the notification reason received in the SCN is "user joined" or "user left", the Tree Leader will increment or decrement the user count associated with a given subnode and tree. If the user subnode count for the given tree is equal to zero, and the notification reason is that "user left" and the node and subnode IDs happen to be the last elements in a given path or branch of the tree, the Tree Leader will prune the path by removing the record of the link into that subnode via sending a "tree delete" message in both directions on the affected communication link, thereby requesting the receiving Set Managers to delete the tree address in association with that link. Finally, if the Tree Leader determines that the notification reason in the SCN is that the Set Manager did not receive a timely tree refresh message, the Tree Leader must determine whether the identified node and subnode is actually intended to still be included in the tree. If the identified node and subnode should still be included in the tree, then the Tree Leader has not intentionally removed the subnode and it must reextend the tree to the subnode as the Set Manager will have deleted the connections. This type of condition can be caused by a link failure along the path which resulted in failure of the Set Manager to receive the tree refresh message initially. Since the Set Manager did not receive the refresh message and the timeout would have occurred, the tree must be recreated or extended. Similarly, the Set Manager might not receive an intended tree discard message and the Tree Leader might determine that the affected node and subnode are no longer desired on the tree and would so need take no action. Furthermore, when a Tree Leader determines that a disconnected subnode should actually be still included in the distribution tree, it may infer that all subnodes downstream of the disconnected subnode are also disconnected from the tree and it must reextend the tree to these subnodes as well.

In FIG. 2, Set Manager 1 receives a positive Join Reply, a positive Leave Reply, or an indication that a TU has failed as noted above, and proceeds down one of several paths in FIG. 2. If a local user joins a set, box 2 is entered where it is determined whether there are other distribution trees associated with the group ID of the particular user's subnode and if the answer is no, box 3 returns the process to Box 1 of the set managing process. If the answer is yes, however, box 4 is entered is and a list of distribution trees including the group ID for the transmission user subnode is created. Then box 5 is entered where the content of the list is checked to determine whether the distribution tree list is empty. If the answer is yes, the process returns via box 7 to the Set Manager 1. If the answer is no, however, the process continues to box 6 where the distribution tree set membership notification value is checked for a 01 or 11 indication. If neither of these is present, box 10 is entered and the distribution tree is removed from the list of trees generated in box 4 and the process continues back to box 5 to check any other trees in the list.

If, however, the set membership notification value is 01 or 11 in box 6, box 8 is entered and the "terminal edge", i.e. the subnode connection point within the node serving a given TU, is recorded in association with the tree address for the distribution tree and block 9 is entered. In Block 9, the Set Manager constructs and sends an SCN to the Tree Leader with a reason code: "user joined" and giving the subnode's transmission user count currently maintained by the Set Manager. Then box 10 is entered and this distribution tree is removed from the list of trees which must be processed and notified in accordance with the indication received by the Set Manager.

If a transmission user leaves a given set, Set Manager 1 enters Block 11 to determine whether there are multiple distribution trees associated with the group ID of the particular transmission user subnode. If the answer is no, box 12 returns the process to Set Manager 1. If the answer is yes, box 13 is entered which, like box 4, generates a list of distribution trees presently associated with the group ID of a given transmission user subnode. Then Block 14 is entered to determine, as with block 5, whether the list of trees is empty and if the answer is yes, the process returns via block 15 to the Set Manager function. If the answer is no, however, the tree address is deleted from the transmission user's list maintained for the subnode connection, i.e. the transmission user's terminal edge at the given node as shown in block 16.

The process then enters block 17 to determine if the tree address is recorded for any terminal connection point in the subnode. If the answer is no, block 19 is entered and the SCN message is constructed and sent to the Tree Leader with the reason code transmission user left together with the present subnode transmission user count.

If the answer is block 17 is yes, however, block 18 is entered to determine whether the distribution tree's membership notification value is 10 or 11 and if the answer is no, process returns back to block 14 to process any other distribution trees in the list. If the answer in block 18 is yes, block 19 is entered and the SCN is constructed and sent as described.

If the tree refresh timeout timer expires, without having received a refresh message from the Tree Leader, then the Set Manager 1 enters block 20 where it constructs and sends the SCN message to the Tree Leader with a reason code indicating that it "did not receive the tree refresh message" and giving the present subnode ID affected. It then proceeds to box 21 to delete the tree address from the links and terminal connection points at each subnode that is affected and returns to the Set Manager process via block 22.

Figure 3:
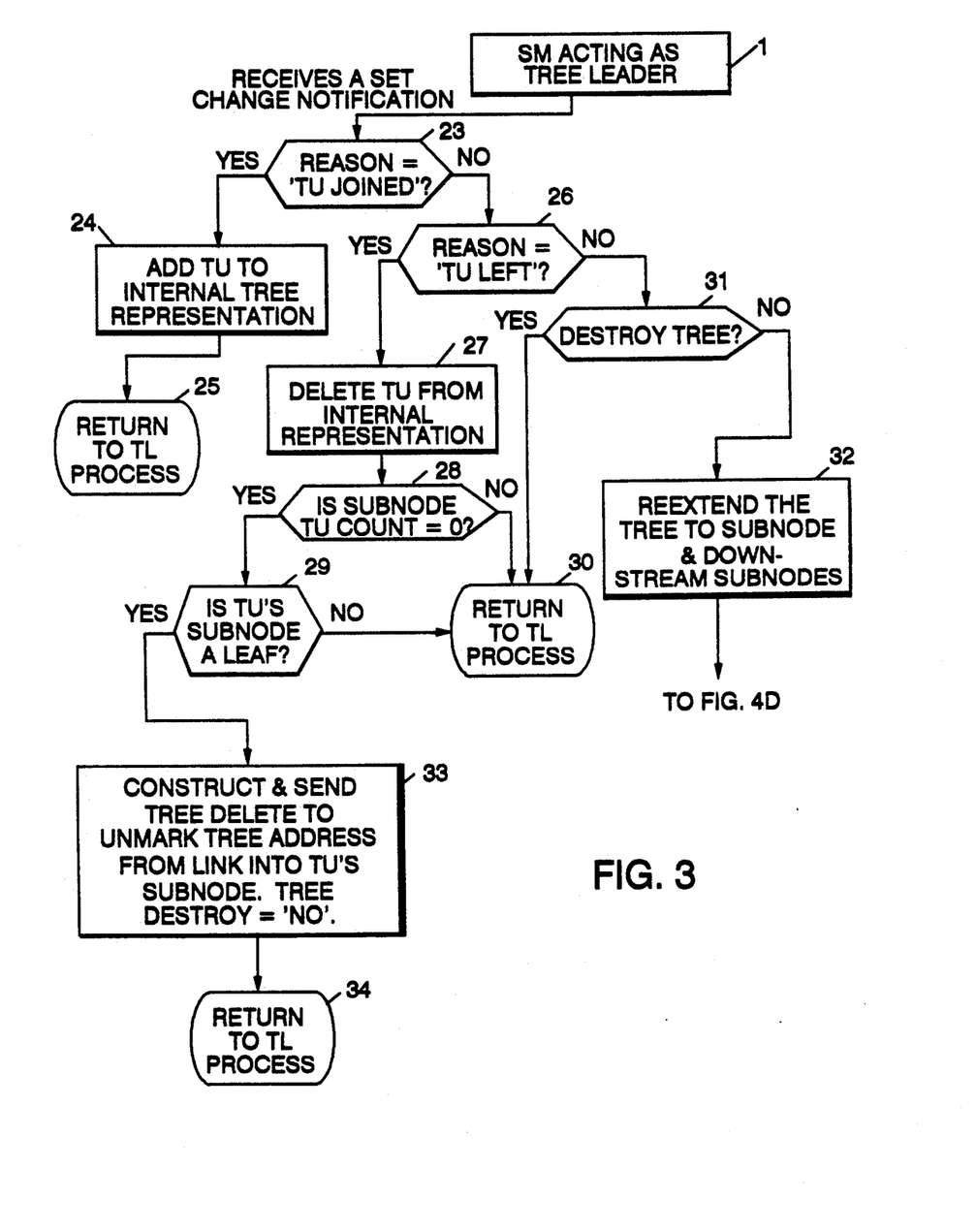
FIG. 3 illustrates schematically a flowchart of operations conducted by a Set Manager acting as Tree Leader when it receives a set change notification message from a node participating in the distribution tree which the Tree Leader manages.
Figure 4A:
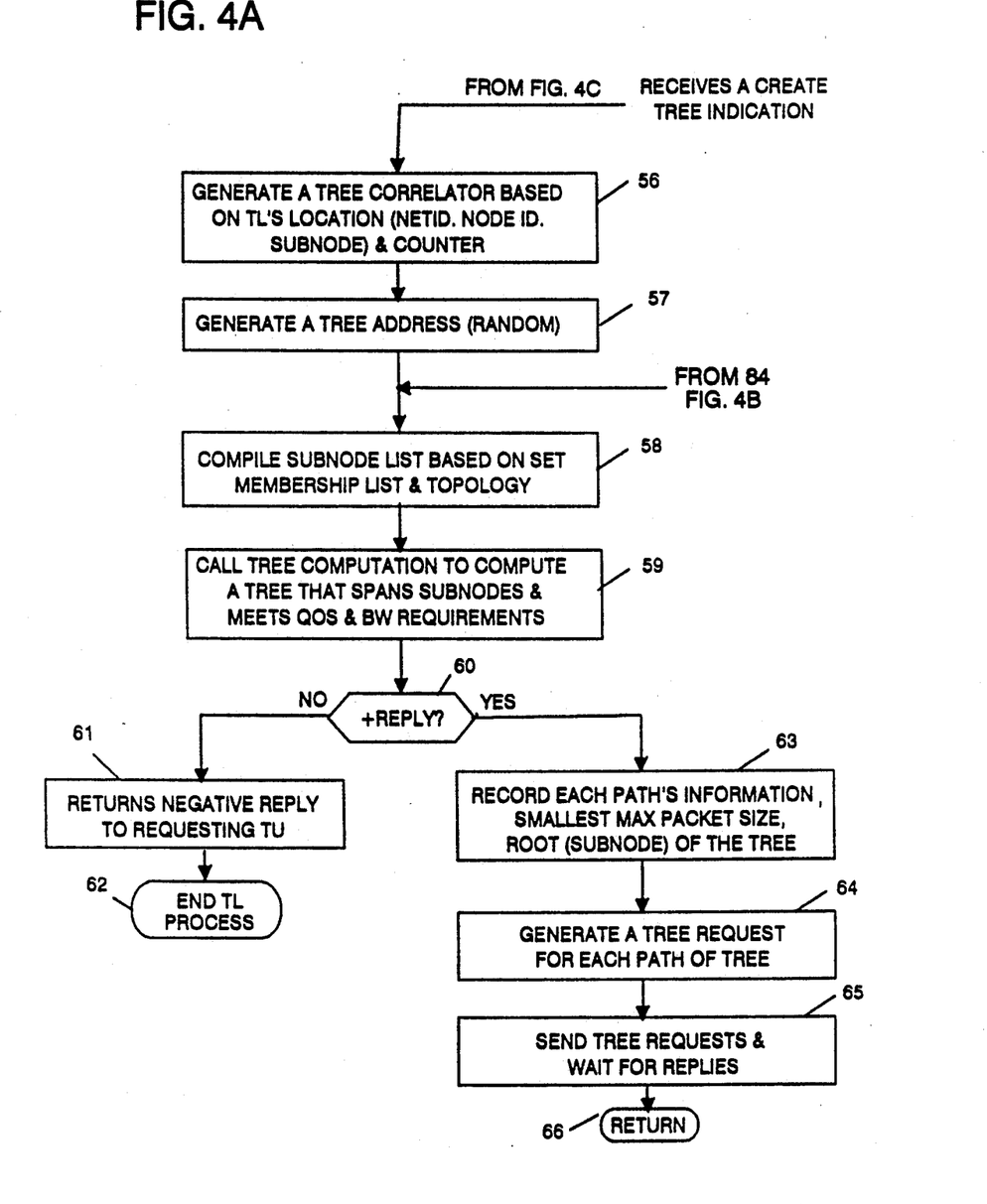
FIG. 4, consisting of FIGS. 4A-4D which are joined into a continuous flowchart as shown by the labels thereon, schematically illustrates the operations of the Tree Leader in response to the messages received from the various participating node Set Managers.
Figure 4B:
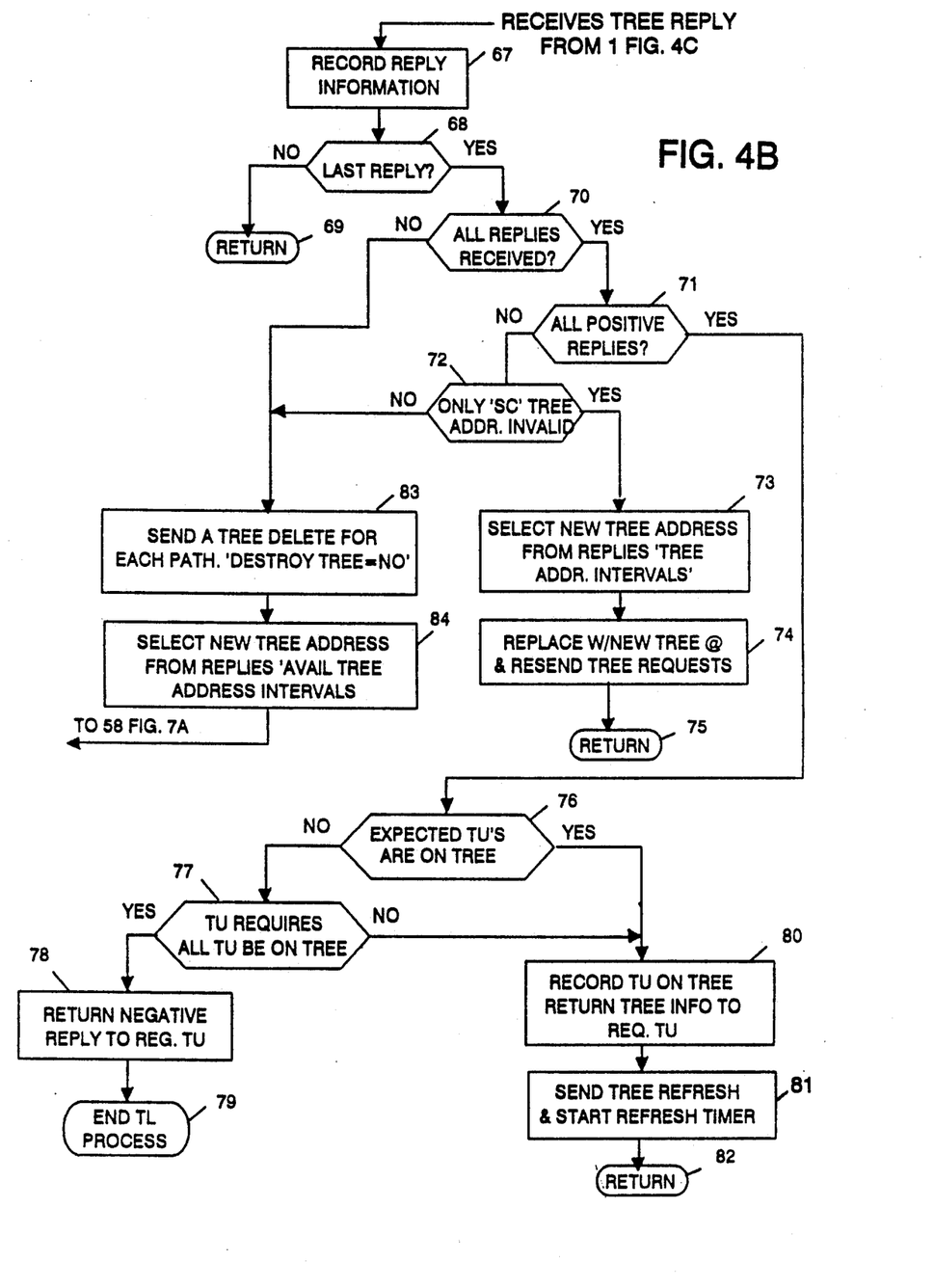
Figure 4C:
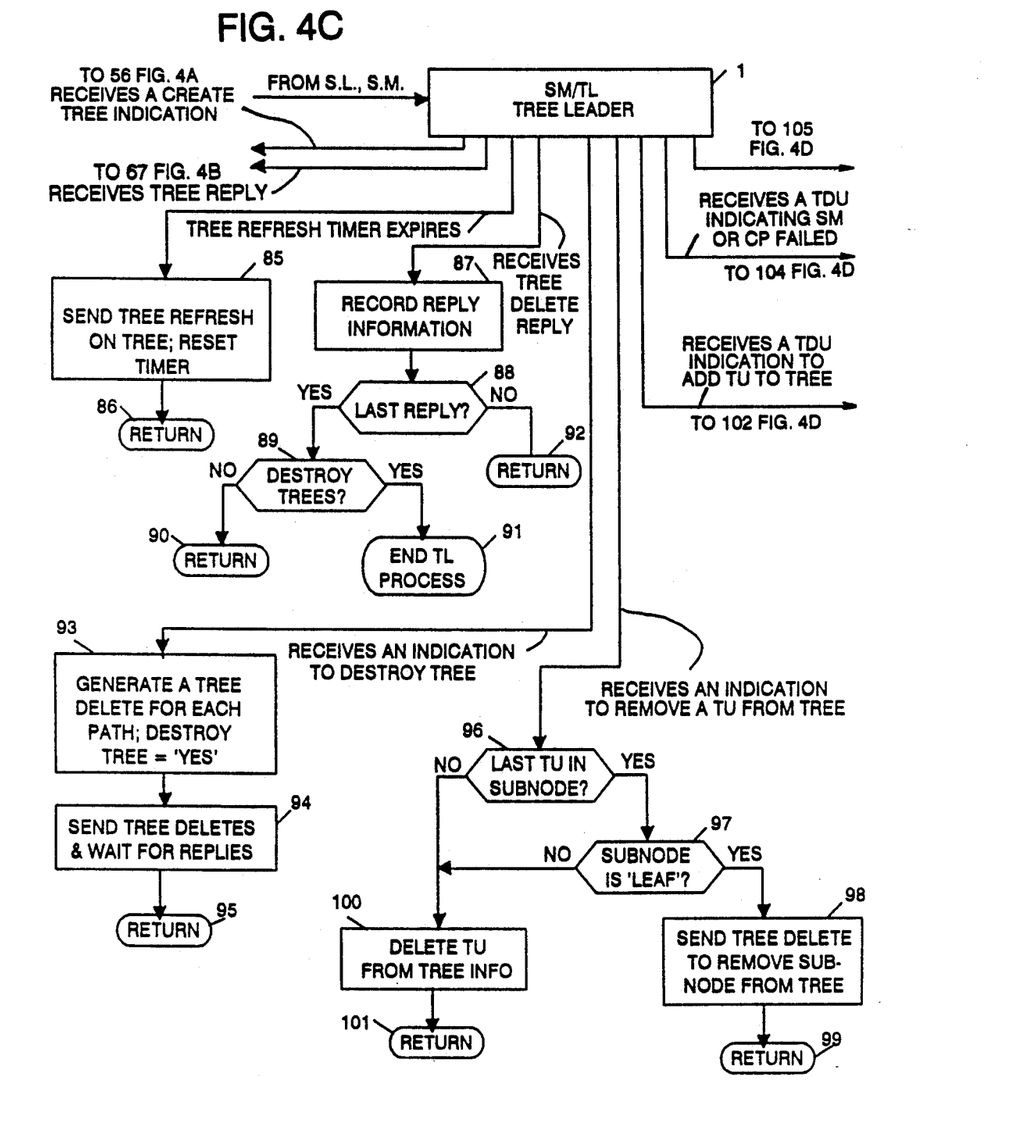
Figure 4D:
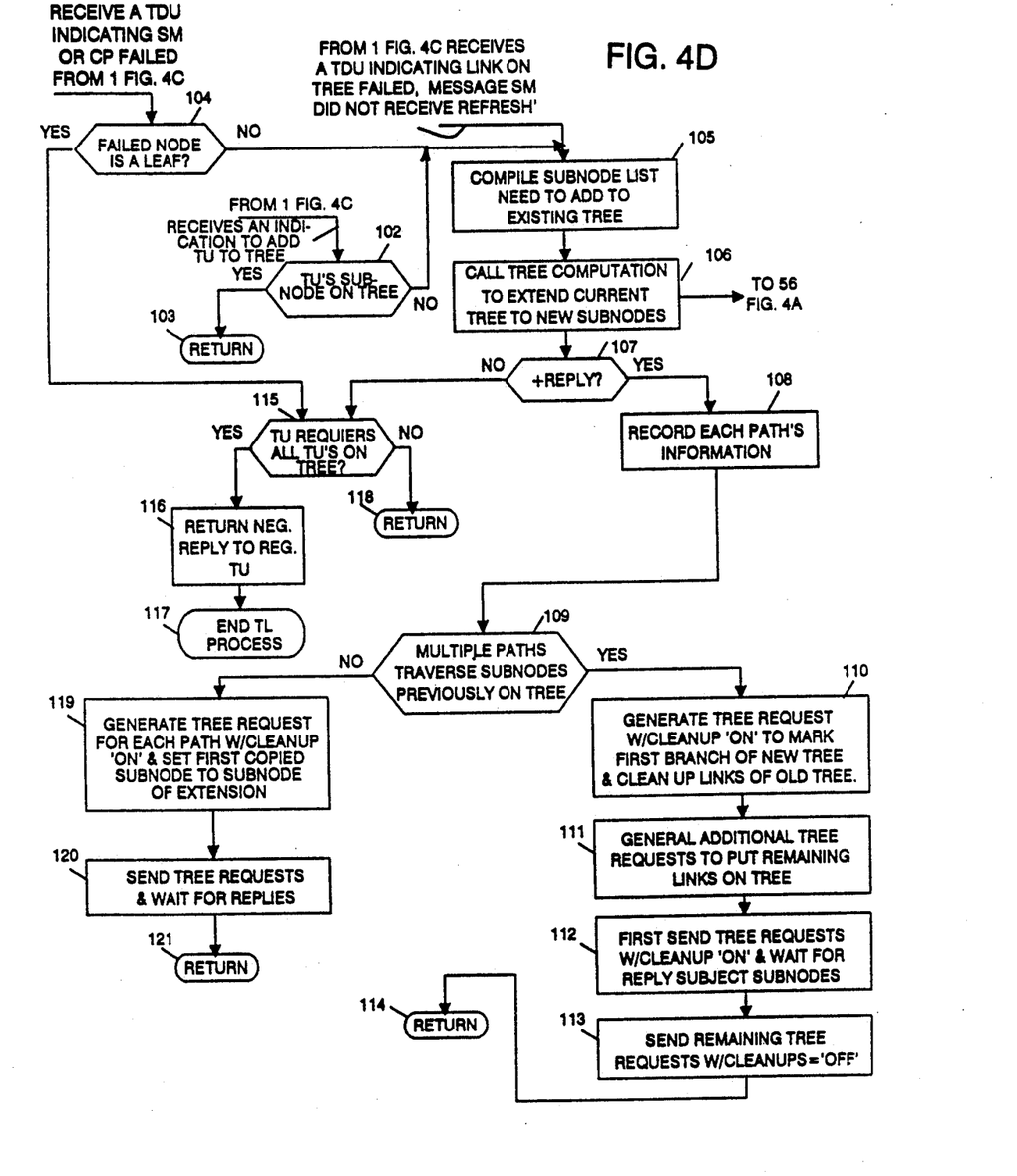

Turning to FIG. 3, when the Set Manager is acting as Tree Leader, it receives Set Change Notification messages generated by Set Managers as shown in FIG. 2. The SCN message is examined in block 23 to determine if the reason code indicates that a user has joined. If the answer is yes, the user is added to the internal tree list or record maintained by the Tree Leader in block 24 and process returns via block 25 to the Tree Leader process in block 1. If the answer is no in block 23, block 26 is entered to determine if a reason is that the user has left. If the answer is no, block 31 is entered to determine whether the tree should be destroyed and if the answer is yes, the process returns to the Tree Leader via block 30. But if no, the tree is to be reextended back to the subnode and any downstream subnodes as shown in block 32. Block 32 enters FIG. 4D at block 105 for reextending the distribution tree that has been inadvertently truncated. This uses the same process as was described with respect to our aforementioned copending application Ser. No. 07/900,628. Therefore, FIG. 4D is a portion of the original FIGS. 7A–7D of that application. Indeed, FIGS. 4A–4D, but for the renumbering on the figures, are same as FIGS. 7A–7D in that application.

If the reason code in block 26 is determined to be that a user has left the set, block 27 is entered and the Transmission User is deleted from the internal list associated with the tree and block 28 is entered to determine if the count for a given user's subnode is now 0. If the answer is no, block 30 returns to the Tree Leader process but if the answer is yes, it is necessary to determine whether the TU which has left the subnode was the leaf or outermost point on a path. This is done in block 29. If the answer is no, the Tree Leader process is returned via block 30, but if the answer is yes, it is necessary to construct and send the tree delete message to delete the tree address from the link into the TU's subnode with the "tree destroy indicia" set to no. This serves as acknowledgement to the affected Set Manager at a given node and subnode that the user has been deleted from the tree. The process then returns via block 34.

FIGS. 4A–4D are a reproduction of FIGS. 7A–7D in our aforementioned copending application. That portion of FIG. 4 shown in 4D beginning at block 105 describes the process carried out by a Tree Leader when the refresh timeout has occurred or a link of the tree has failed and is self explanatory.

From the foregoing, it may be easily appreciated that many distribution trees associated with a given user set can exist and be maintained without Set Leader's intervention. This eliminates network control flows of messages required when Tree Leaders need to gain knowledge of set membership changes since they are notified by the Set Managers from the affected nodes and subnodes. Secondly, each Tree Leader can define its own particular desired type of set membership notification based upon a given user's application requirements. It eliminates a race condition that may occur when set membership changes occur during a time a Tree Leader is acquiring new information and the time that the tree was originally created and it provides a distributed method and apparatus for handling set membership and communication link failures.

Having thus described our invention with respect to a preferred embodiment thereof and having illustrated its preferred implementation in a detailed flowchart, it will be apparent to those of skill in the art that the arbitrary digital reason codes and the specific order of the process steps may be easily modified to accomplish the same results by assigning different codes as desired or by performing the various requisite process steps in a different order without departing from the spirit and scope of the invention. Therefore, what is desired to be protected by letters patent and which is set forth in the appended claims is included by way of description only and not as of limitation.

What is claimed is:

1. A communications network having a plurality of nodes interconnected to one another by communications links via which links messages may be sent and delivered to one or more communication network users residing at one or more of said nodes, said network being organized for communication among an arbitrary group of member of a defined subset of communications network users into one or more distribution trees, wherein each said node includes means for operating as a Distribution Tree Leader for at least one said subset of communications network users, said Distribution tree Leader including means for generating a distribution tree address and a distribution tree address correlation identifier which uniquely identify said distribution tree at all said nodes having members of said subset included by said Distribution Tree Leader in said distribution tree, and means for generating and sending to all said nodes having members served by said distribution tree, a distribution tree creation request message including a Set Change Notification indicator, each said node further comprising:

means for reporting link, node or user terminal failures and changes in distribution tree membership of any communications network user served by said node including means for creating and sending on said network a network change notification message addressed to each said Distribution Tree Leader which requested notification in said tree creation request message.

2. The network as claimed in claim 1, further comprising:

first means at each node for examining a received said network change notification message and for determining whether said node is acting as a Distribution Tree Leader for the said distribution tree in which is located said node which is reporting conditions via said network change notification message and, second means, responsive to a true determination from said first means, for examining network change notification messages and for determining whether a current tree member communications network user count for the node which generated said network change notification is greater than zero and if so, said second means incrementing or decrementing said tree member communications network user count at said node in accordance with the effect of said network change notification.

3. The network as claimed in claim 1, further including means for identifying any said communications network users connected to said node with said distribution tree's unique identity.

4. The network as claimed in claim 2, further including means for identifying any said communications network users connected to said node with said distribution tree's unique identify.

5. The network as claimed in claim 4, further comprising:

means, responsive to receipt of a said network change notification message containing an indication that a said communications network user has left said distribution tree and that said user was served by a said node which was the last node in a communications link, for pruning said distribution tree by removing said distribution tree's unique identity.

6. The network as claimed in any one of claims 1–5, further including;

means, responsive to receipt of said network change notification message containing a report that notification is due to failure of a reporting node to receive a timely tree refresh message from said Distribution Tree Leader, for determining whether said reporting node should still included in said distribution tree and, if true, for recreating said distribution tree to include said node.

7. The network as claimed in claim 6, further including:

means for recreating said distribution tree to include any nodes downstream from the said report node which was to be included in said tree.

* * * * *